UNITED STATES PATENT OFFICE.

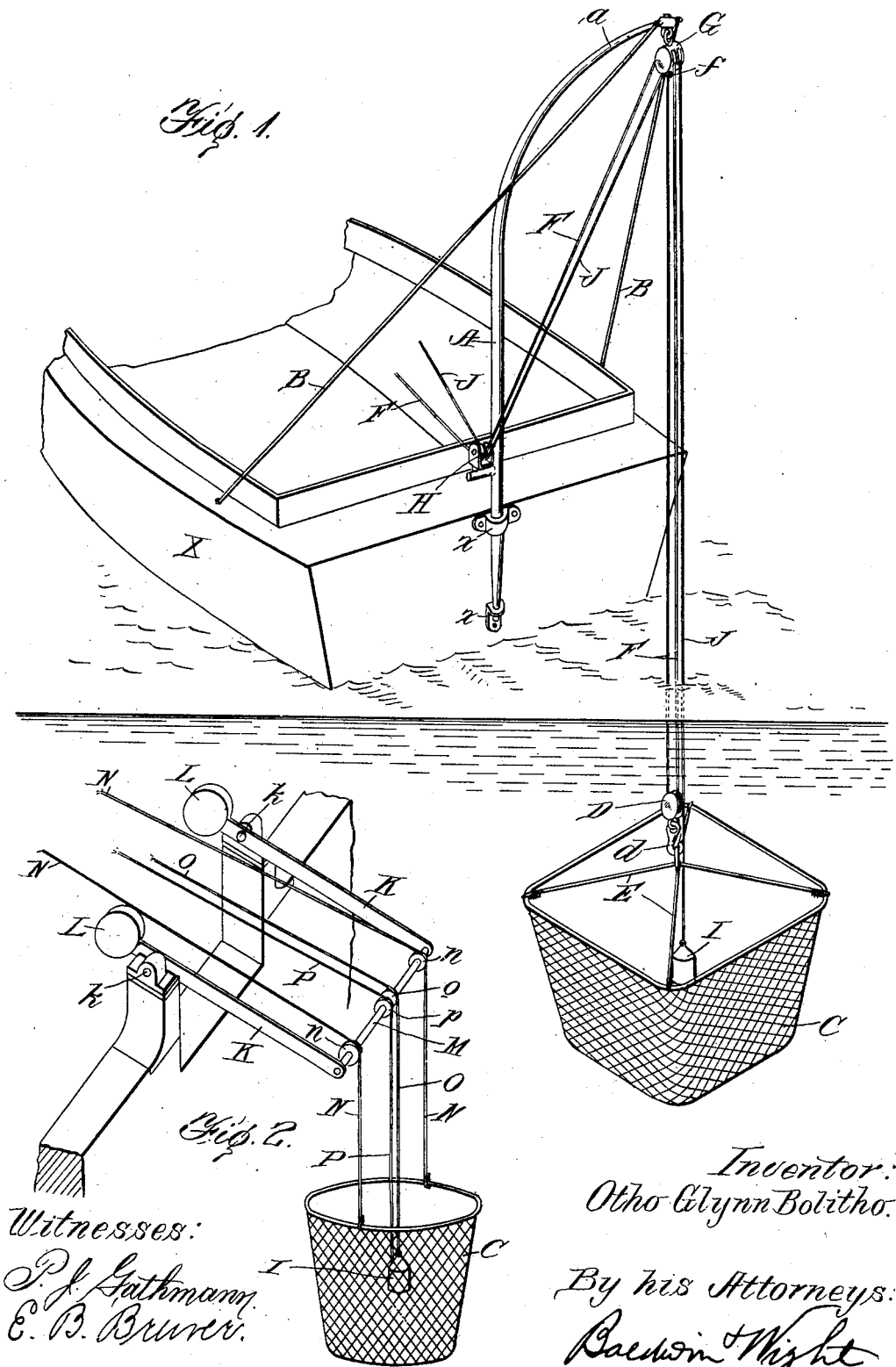

OTHO GLYNN BOLITHO, OF PENZANCE, ENGLAND.

APPARATUS FOR CATCHING FISH.

No. 827,076.  Specification of Letters Patent.  Patented July 31, 1906.

Application filed November 16, 1905. Serial No. 287,639.

*To all whom it may concern:*

Be it known that I, OTHO GLYNN BOLITHO, a subject of the King of Great Britain, residing at Kenegie, Gulval, Penzance, Cornwall, England, have invented certain new and useful Improvements in Apparatus for Catching Fish, of which the following is a specification.

According to this invention fish are caught in a trap or net into or toward which they are attracted by a lamp. The trap or net is suspended from a frame by means of tackle whereby the net may be raised and lowered. Tackle is also provided by means of which the lamp may be separately raised or lowered, and the frame is movable in such manner that it may be swung out from a boat or from shore or swung in when landing the net.

In the accompanying drawings, Figure 1 is a perspective view of my improved apparatus applied to a boat. Fig. 2 is a perspective view of a modified form of the apparatus.

In Fig. 1, A indicates a movable frame or arm applied to a boat X and supported in suitable bearings $x$, so as to be able to turn about a vertical axis. The frame has an overhanging portion $a$, to which guy lines or rods B are applied. The net or trap C may be of any approved construction, and it is provided with tackle supported on the frame A, by means of which it can be raised and lowered. In this instance the pulley-block D is provided with a hook $d$, engaging the ropes or bails E of the net. A rope F is attached at $f$ to a pulley-block G, suspended from the frame A, and passes around the pulley-block D, through the pulley-block G, and through a guide-roller H, mounted in suitable bearings near the lower end of the frame A. By this tackle the net or trap may be raised or lowered to any desired extent, and by swinging the frame A the net may be moved out away from the boat or moved into the boat or within convenient reach of the attendant.

The lamp I is provided with separate tackle, by means of which it may be separately raised and lowered. As shown in Fig. 1, a rope J, attached to the lamp, passes over a pulley in the block G and down under a guide-roller at H. Thus the lamp and the net may be separately raised and lowered. After the net has been set some time the lamp may be raised out of the way, and then the net may be separately raised, thus avoiding any danger of twisting the ropes.

In Fig. 2 the supporting-frame is shown as consisting of parallel arms K, pivoted at $k$ to suitable supports and provided with counter-weights L. The outer ends of the arms are connected by a cross-bar M, carrying guide-pulleys for the ropes which support the net and the lamp. The net C in this instance is shown as being provided with two supporting-ropes N, which pass over the pulleys $n$ on the rod M.

The lamp I may be an electric lamp and is supported by a rope O, passing over a pulley $o$. It may be desirable to supply current to the lamp through a separate wire or cable, which is indicated at P, and it is preferable to provide a separate guide-pulley $p$ on the rod M for this cable. Thus the net may be raised and lowered and swung into the boat or within convenient reach, and the lamp may be raised and lowered separately whenever desired.

I claim—

1. The combination of a bag net or trap, a movable supporting-frame, tackle suspending the net from the frame, a lamp and independent means for raising and lowering the lamp out of and into the net.

2. The combination of a bag net or trap, a swinging supporting-frame, tackle supported by the frame for raising and lowering the net, an electric lamp, tackle supported by the frame for raising and lowering the lamp, and an electric conductor supported by the frame and extending to the lamp.

OTHO GLYNN BOLITHO.

Witnesses:
 JOHN H. WHITEHEAD.
 FREDK. C. WEATHERLY.